Feb. 7, 1933.    F. G. JOHNSON    1,896,585
PHOTOGRAPHIC FLASH LIGHT APPARATUS
Filed May 2, 1931    2 Sheets-Sheet 1

Inventor:
Frederick George Johnson
By [signature]
Attorney.

Feb. 7, 1933.　　　　　F. G. JOHNSON　　　　　1,896,585
PHOTOGRAPHIC FLASH LIGHT APPARATUS
Filed May 2, 1931　　　2 Sheets-Sheet 2
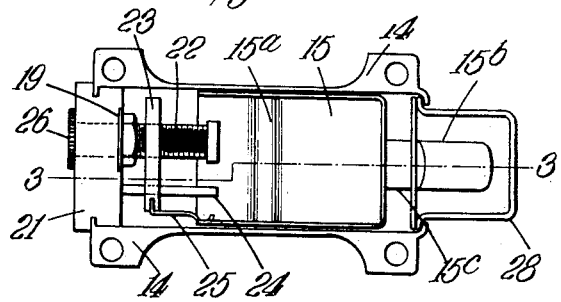
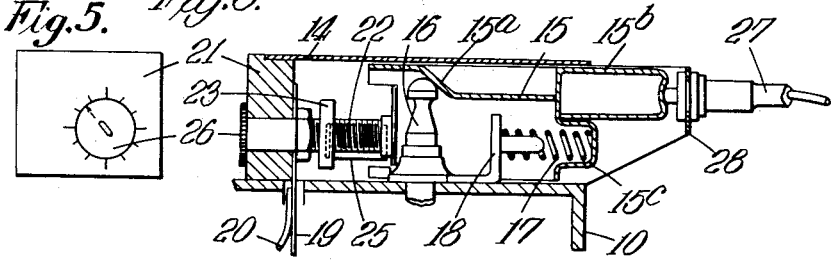
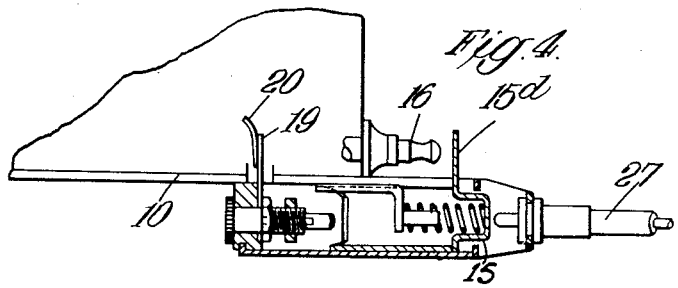
Inventor:
Frederick George Johnson
By
Attorney.

Patented Feb. 7, 1933

1,896,585

UNITED STATES PATENT OFFICE

FREDERICK GEORGE JOHNSON, OF LONDON, ENGLAND

PHOTOGRAPHIC FLASH LIGHT APPARATUS

Application filed May 2, 1931, Serial No. 534,619, and in Great Britain March 28, 1931.

This invention relates to photographic flash-light apparatus and more particularly, but not exclusively, to apparatus of this kind comprising the combination of a photographic camera and a photographic flash-lamp.

When taking flash-light photographs with the known kinds of apparatus in which an electric circuit is connected up to ignite a flash-lamp upon the release of the shutter of the camera, there is a possibility that at high shutter speeds, the shutter has actually moved before the flash is produced and consequently only a portion of the plate is exposed to the light.

According to the present invention adjustable means are provided on the camera for igniting the flash-lamp so that the instant at which the lamp flashes may be adjusted relatively to the movement of the shutter thereby enabling flash-light photographs to be made at any shutter speed.

The aforesaid adjustable means are preferably associated with the shutter release mechanism and separate from the mechanism for winding up the blind in the case of a camera provided with a roller blind shutter so that the blind may be wound up before taking the photograph and with the flash-lamp in readiness for operation without igniting the latter.

The adjustable means, moreover, may advantageously comprise a movable element which either directly or through a member associated therewith, operates the shutter releasing mechanism and one or more contacts mounted in adjustable relation to said movable element, or member associated therewith.

In order that the invention may be better understood and readily carried into effect, several embodiments thereof applicable to photographic cameras for press work and amateur use will now be described with reference to the accompanying drawings wherein :—

Figure 2 is an underneath plan of the device drawn to an enlarged scale,

Figure 3 is a cross section on the line 3—3 of Figure 2,

Figure 4 is a modification of the device shown in Figures 1 to 3 suitable for use when the camera is provided with a forwardly projecting press release for the shutter, and Fig. 5 is an end elevation of the housing shown in Fig. 3.

Figure 1:
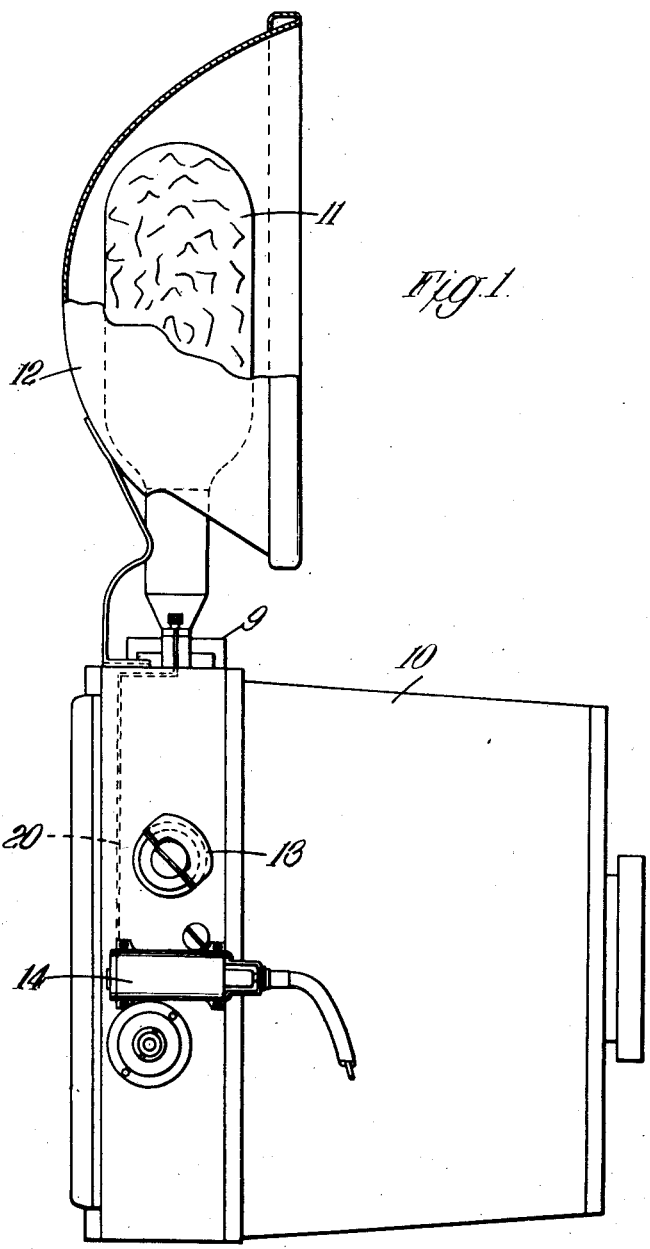
Figure 1 is a general side view of a collapsible focal plane camera, having a photographic flash-lamp and reflector combined therewith, and with a device according to the invention applied thereto.

Referring to Figures 1 to 3 of the drawings, a photographic camera designated generally by the reference 10 and having the usual operating means 13 for winding up the roller-blind shutter, has combined therewith a photographic flash-lamp 11 and reflector 12 in known manner, together with an electric battery 9 for supplying current to ignite the photographic flash-lamp 11. A housing 14 is secured to the side of the camera 10 below the blind-operating means 13 and conceals the press release 16 (Figure 3). Within the housing 14 is a sliding shoe 15, the lower side of which is formed as a cam surface 15a which, when the shoe is pressed inwardly, engages with the press release 16 which releases the shutter of the camera in known manner. The shoe 15 is guided in the housing 14 by means of two cylindrical extensions 15b and 15c, which project through corresponding apertures in the housing 14.

The cylindrical extension 15c constitutes a hollow recess or projection to form an abutment for a small helical spring 17 the other end of which abuts a fixed stop 18 arranged in front of the press release 16. Mounted within and insulated from the section of the housing 14 not normally occupied by the sliding shoe 15, is an inwardly projecting contact 19 of spring metal and adapted normally to contact with a conductor 20 forming part of the photographic flash-lamp and battery circuit. This spring metal contact 19 is apertured and is secured to its insulating support 21, which as shown constitutes the end of the housing 14, by a screw-threaded pin 22 passing through an aperture in the insulating support 21, through the aperture in the contact 19 and through a tapped aperture in a small metallic plate 23, which is prevented from rotating on the pin 22 by a small fixed rod 24 passing through a second aperture in the plate 23, as shown in Figure 2. The plate 23 is provided thereon with a small resilient contact 25, which is engaged by one of the sides of the sliding shoe 15 when it is moved to operate the shutter of the camera 10, and is capable of a precision adjustment relatively to the shoe 15 by movement of the metallic plate 23 along the screw-threaded pin 22. As shown in the drawings the outer end of the pin 22 externally of the metallic housing 14 is provided with a milled-edged knob 26 so that the contact 25 carried by the metallic plate 23 may be accurately set in relation to the portion of the metallic shoe 15 which makes contact therewith. The knob 26 may be graduated in terms of shutter speeds or otherwise to indicate against a stationary pointer mounted on the insulating support 21, the different settings required for various speeds of shutter movement. If desired, however, the milled-edged disc or knob 26 may be provided with a pointer or other visible indicating means to register with graduations on the insulating support 21, peripherally of the knob. Moreover, it will be understood that by means of a movement of the screw-threaded pin 22 the flash of the flash-lamp 11 may be varied so as to occur before, simultaneously with, or after the initial movement of the shutter to suit different requirements.

The operation of this form of the device is as follows:—

The cylindrical extension 15b of the shoe 15 serves as the operating means for the device and is adapted to be pressed inwardly either by hand or by means of an antinous release 27 mounted in a bridge 28 slidably secured in guides on the housing 14.

Having wound up the roller-blind shutter of the camera by means of the operating means 13 when the shutter is of the roller-blind type, and upon pressing inwardly the cylindrical member 15b, the shoe 15 engages with the press release 16 to actuate the shutter and either simultaneously therewith, before or after this actuation the side face of the shoe 15 makes contact with the small resilient contact 25 to complete the flash-lamp circuit from the conductor 20, through the contact 19 to the screw-threaded pin 22, plate 23, resilient contact 25 and shoe 15 to ground. When the flash-lamp circuit is, as described above, the terminal of the electric battery 9, which is not connected to the conductor 20, is normally grounded by connection with the metallic part of the side of the camera 10 upon which the housing 14 is mounted. It will be understood, however, that the electric battery and photographic flash-lamp circuit is susceptible of various modifications and forms no part of the present invention.

Referring to Figure 4, this shows the application of the device to a photographic camera, in which the press release 16 for the shutter projects forwardly of the camera body instead of outwardly as shown in Figures 1 to 3. The cam surface 15a of the sliding shoe 15 is accordingly dispensed with, its place being taken by the projection 15d which strikes the press release 16 when the shoe 15 is pressed inwardly by the antinous release 27. The operation of this form of the device will be apparent from the operation of the arrangement previously described with reference to Figures 1 to 3.

The term "shutter" as used herein is intended to cover shutters of the roller-blind, iris-diaphragm or across-the-lens type or any modified or combined form of these shutters.

It should be understood that although two embodiments of the invention have been described as applied to a press camera and amateur camera, respectively, the arrangement and adaptation of the parts according to the invention is susceptible of substantial variation to suit different requirements, the essential feature of the invention consisting in the provision of means for adjusting with precision the instant at which the lamp flashes relatively to the initial movement of the shutter.

What I claim is:—

1. A switch device for operating the shutter release of a photographic camera in timed relation to the closing of the ignition circuit of flash-light apparatus, comprising a member slidable to operate a press release for the shutter of said camera, a housing in which said member slides, an insulating plate constituting part of said housing, a screw-threaded member mounted in said insulating plate, a non-rotatable member traversable along said screw-threaded member, and a contact on said non-rotatable member with which said slidable member engages to complete said electric circuit and ignite said photographic flash-lamp.

2. A switch device for operating the shutter release of a photographic camera in timed relation to the closing of the ignition circuit of flash-light apparatus, comprising a slidable member provided with a cam surface to operate the press release for the shutter of said camera, a housing in which said member slides, an insulating plate constituting part of said housing, a screw-threaded member mounted in said insulating plate, a non-rotatable member traversable along said screw-threaded member, and a contact on said non-rotatable member with which said slidable member engages to complete said electric circuit and ignite said photographic flash-lamp.

3. A switch device for operating the shutter release of a photographic camera in timed relation to the closing of the ignition circuit of flash-light apparatus, comprising a member slidable to operate the press release for the shutter of said camera, a housing in which said member slides, an insulating plate constituting part of said housing, a screw-threaded member mounted in said insulating plate, a non-rotatable member traversable along said screw-threaded member, a contact on said non-rotatable member with which said slidable member engages to complete said electric circuit and ignite said photographic flash-lamp, and means for giving a visible indication of the position of said contact relatively to said slidable member and consequently of the advancement or retardation of the flash of said photographic flash-lamp relatively to the movement of the shutter of said camera.

4. A switch device for operating the shutter release of a photographic camera in timed relation to the closing of the ignition circuit of flash-light apparatus, comprising a member slidable to operate the press release for the shutter of said camera, a housing in which said member slides, an insulating plate constituting part of said housing, a screw-threaded member mounted in said insulating plate, a tongue member projecting from said screw-threaded member to make contact with a conductor in said electric circuit, a disc mounted upon the outer end of said screw-threaded member and having visible indicating means thereon registering with indicating means on said insulating plate, a nonrotatable member with which said slidable member engages to complete said electric circuit, a pin projecting inwardly from said insulating plate and passing through an aperture in said non-rotatable member, a resilient contact on said non-rotatable member with which said slidable member engages to complete said electric circuit and ignite said photographic flash-lamp.

In testimony whereof I hereunto affix my signature this 23rd day of April, 1931.

FREDERICK GEORGE JOHNSON.